United States Patent
Van de Moortele

(10) Patent No.: US 9,505,604 B2
(45) Date of Patent: Nov. 29, 2016

(54) DISPENSING DEVICE PROVIDED WITH AN ACOUSTIC SIGNAL

(71) Applicant: DOTRACO, naamloze vennootschap, Antwerp (BE)

(72) Inventor: Guido Ivo Cesar Van de Moortele, Antwerp (BE)

(73) Assignee: DOTRACO, naamloze vennootschap, Antwerp (BE)

( * ) Notice: Subject to any disclaimer, the term of this patent is extended or adjusted under 35 U.S.C. 154(b) by 0 days.

(21) Appl. No.: 14/417,609

(22) PCT Filed: Jul. 17, 2013

(86) PCT No.: PCT/BE2013/000037
§ 371 (c)(1),
(2) Date: Jan. 27, 2015

(87) PCT Pub. No.: WO2014/019032
PCT Pub. Date: Feb. 6, 2014

(65) Prior Publication Data
US 2015/0217988 A1    Aug. 6, 2015

(30) Foreign Application Priority Data

Jul. 31, 2012   (BE) .................................. 2012/0525

(51) Int. Cl.
*B65G 59/00* (2006.01)
*A24F 15/04* (2006.01)
*A61L 2/00* (2006.01)
(Continued)

(52) U.S. Cl.
CPC ................ *B67D 7/565* (2013.01); *C02F 1/68* (2013.01); *C02F 1/686* (2013.01); *C02F 2307/14* (2013.01)

(58) Field of Classification Search
CPC .............. B01F 3/00; A61L 2/00; C02F 1/00; C01F 1/68; E04H 4/00
USPC ............. 422/292, 300; 210/167.01; 222/173; 221/92, 186
See application file for complete search history.

(56) References Cited

U.S. PATENT DOCUMENTS

2007/0175806 A1    8/2007   McKinney
2008/0149562 A1    6/2008   Tarr et al.

FOREIGN PATENT DOCUMENTS

DE           22 30 422 A1    1/1974
DE              2230422  *   1/1974    ................ C01F 1/68
DE        10 2008 011276 A1  9/2009

(Continued)

OTHER PUBLICATIONS

European English Translation of the Description, Claims, and Drawings of DE 2230422.*

(Continued)

*Primary Examiner* — Monzer R Chorbaji
(74) *Attorney, Agent, or Firm* — Renner, Otto, Boisselle & Sklar, LLP

(57) ABSTRACT

Dispensing device (1) provided with an additive (2) for dispensing a dose of an additive to a liquid that is flowing in a pipe, and this device (1) is provided with fastening means to fasten the housing (6) to a water pipe, whereby the dispensing device (1) is provided with audio means (11) that are blocked by the presence of the. additive (2) itself and are unblocked when the additive (2) is entirely or almost entirely consumed and the audio means (11) generate sound in the unblocked state in a mechanical way under the influence of the liquid flow.

24 Claims, 17 Drawing Sheets

(51) Int. Cl.
*B67D 7/56* (2010.01)
*C02F 1/68* (2006.01)

(56) References Cited

FOREIGN PATENT DOCUMENTS

DE 10 2009 017126 A1 4/2011
WO 2011/003476 A1 1/2011

OTHER PUBLICATIONS

International Search Report for corresponding patent application No. PCT/BE2013/000037 dated Sep. 18, 2013.

Examination Report for corresponding European Application No. 13 744 943.5 dated Nov. 25, 2015.

\* cited by examiner

DISPENSING DEVICE PROVIDED WITH AN ACOUSTIC SIGNAL

This application is a national phase of International Application No. PCT/BE2013/000037 filed Jul. 17, 2013 and published in the English language.

The present invention relates to a dispensing device for dispensing a dose of an additive into a liquid.

More specifically it concerns a dispensing device that is used to add small quantities of additive to a liquid flow in a pipe, generally water, while the liquid flows past the dispensing device.

Typically such a device consists of a headpiece with an inlet and an outlet for the connection of the device to the pipe and of a housing with an opening that connects to the headpiece and is provided with fastening means for fastening the housing to the headpiece.

Traditionally such a device also makes use of a cartridge with a certain volume in which the additive is contained and through which the liquid to be treated partially or entirely flows.

The cartridge is formed such that it can be housed in the housing via the aforementioned opening, after which the housing is fastened to the headpiece by means of the aforementioned fastening means.

Dispensing devices are also known in which the additive is placed directly in the housing and the liquid flows entirely or partially through the additive. In the last case the additive is in the form of granules or a granulate.

In this way a dosed quantity of additive can be added to the liquid.

Typically the additive consists of an orthophosphate or polyphosphate or a silicate or a mixture of the aforementioned, and the aforementioned additive is added to the water flow to prevent limescale formation in the pipe.

Although it is sufficient to only add the additive to the water in a limited quantity, i.e. 0-15 ppm, there is no good effect without the additive.

In other words it is important to be able to establish when the additive is entirely or almost entirely consumed.

To this end traditionally the cartridge is equipped with a float that enables the level of the additive in the volume of the cartridge to be shown, or the housing is made transparent in order to see the state of consumption.

A disadvantage of this is that the dispensing device must be checked on a regular basis in order to see the position of the float.

An additional advantage of this is that if the dispensing device is installed in a place that is not frequently visited, is difficult to access or difficult to see, the usefulness of a visual means to identify the level of the additive is rather limited.

A dispensing device equipped with electrical means to identify the level of the additive in the cartridge is also known. The electrical means hereby give a visual or acoustic signal to indicate that the additive has been consumed and that the cartridge is due for replacement.

A disadvantage of such electrical means is that they need electricity to be able to operate.

Another disadvantage is that such means entail a certain cost, which is reflected in a higher purchase price for a dispensing device equipped with such electrical means.

The purpose of the present invention is to provide a solution to the aforementioned and other disadvantages, by providing a dispensing device of the known type, as described above, whereby the dispensing device according to the invention is equipped with audio means that are blocked by the presence of the additive itself and unblocked when the additive is entirely or almost entirely consumed, and the audio means generate sound in the unblocked state under the influence of the liquid flow through the device, and this in a mechanical way.

An advantage of a dispensing device according to the invention is that the sound is produced mechanically under the influence of the liquid flow through the device, such that no electricity or any other drive means is necessary for its good operation.

Another advantage is that the dispensing device can be manufactured cheaply and easily due to the absence of electronic components.

Furthermore an important advantage is that the audio means are always replaced when the additive is reloaded so that any wear of it is ruled out.

Another advantage is that the dispensing device requires no supervision or examination as it automatically warns people in the vicinity if the cartridge is spent and is due for replacement by the generation of an acoustic signal.

With the intention of better showing the characteristics of the invention, a few preferred embodiments of a dispensing device according to the invention are described hereinafter by way of an example, without any limiting nature, with reference to the accompanying drawings, wherein:

FIG. 1 schematically shows a cross-section of a dispensing device with additive in the cartridge according to the invention without flow;

Figure 1:
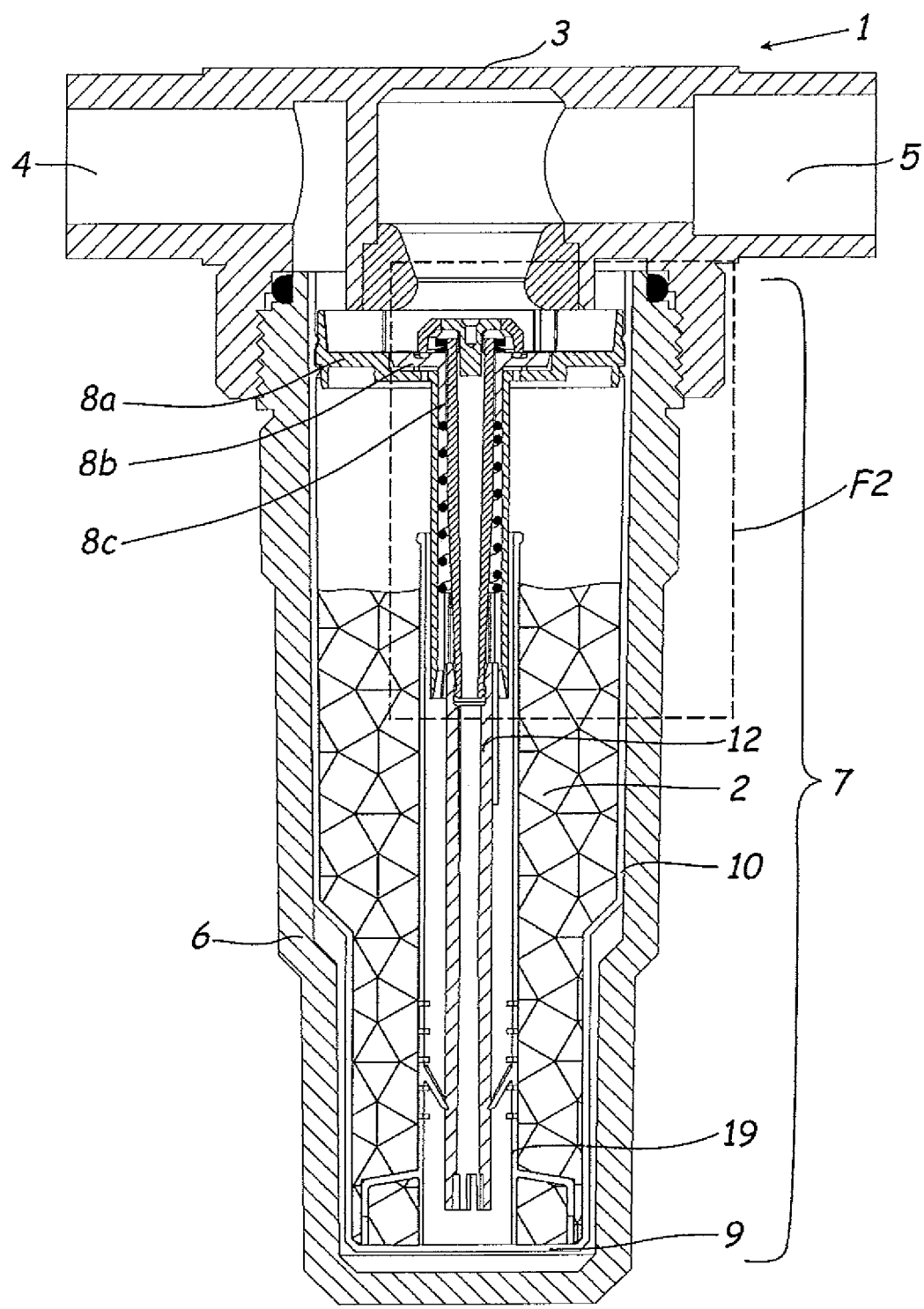

FIG. 1 Schematically shows a dispensing device 1 according to the invention, whereby the device is connected to a water pipe and the cartridge in the device is provided with an additive 2 without the flow of water.

The device 1 consists of a headpiece 3 with an inlet 4 and an outlet 5 for the connection of the device 1 to the water pipe and a housing 6 that is provided with an opening that connects to the headpiece 3. The housing 6 is fastened to the headpiece 3 by a known fastening means such as, in this case, a screw thread connection. A cartridge 7 with a certain volume is housed in the housing 6.

Figure 2:
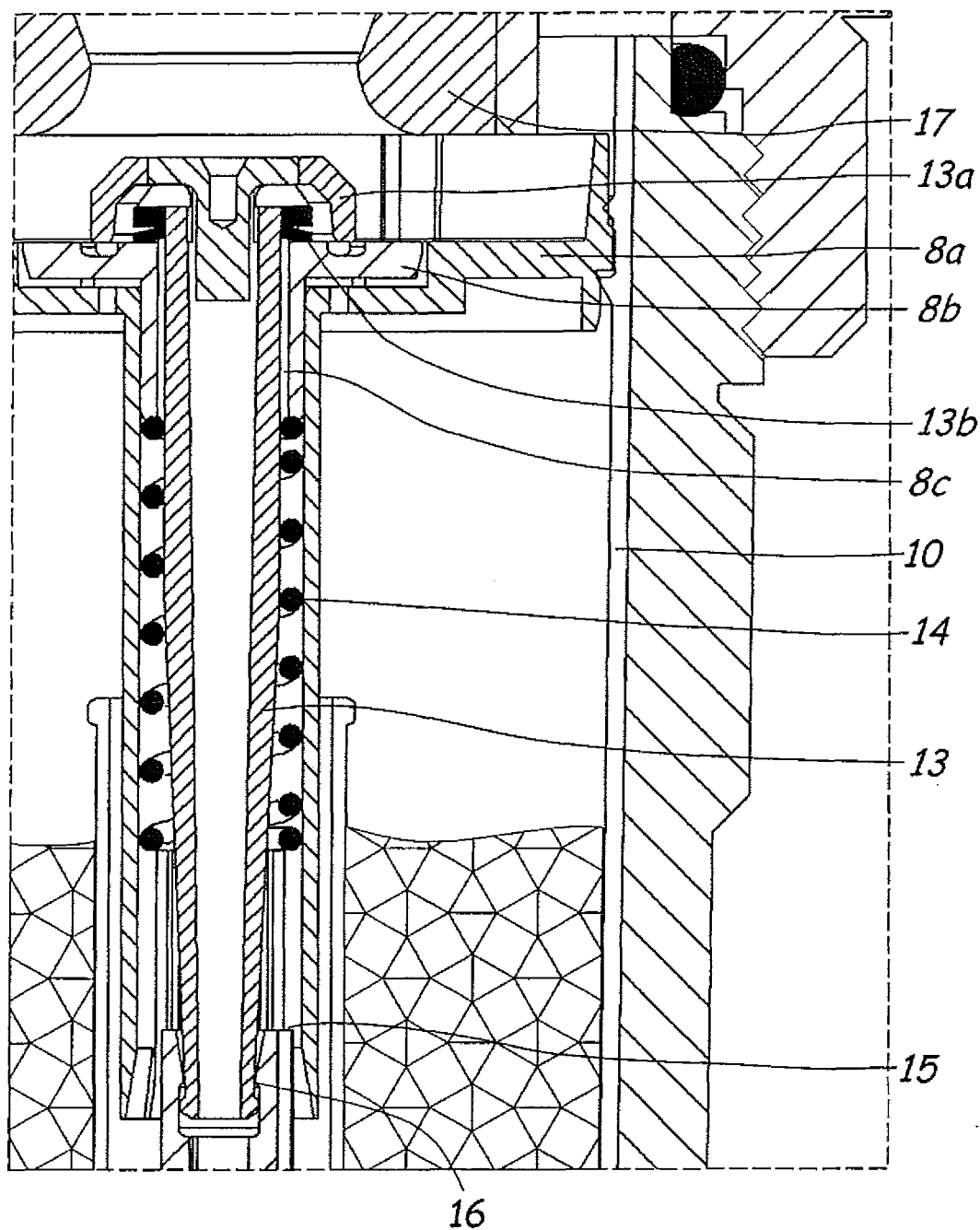
FIG. 2 shows on a larger scale a detail of FIG. 1 indicated by F2.

FIG. 2 shows how the volume of the cartridge 7 is defined by a first wall 8a, in which a small access plate 8b is located, a transit opening 8c and a side wall 10 that extends between the first wall 8a and a second wall 9 at the bottom that forms a whole as a base with the side wall 10. The additive 2 is hereby housed in the volume of the cartridge 7.

FIG. 2 shows the top part of FIG. 1 in more detail.

Figure 3A:
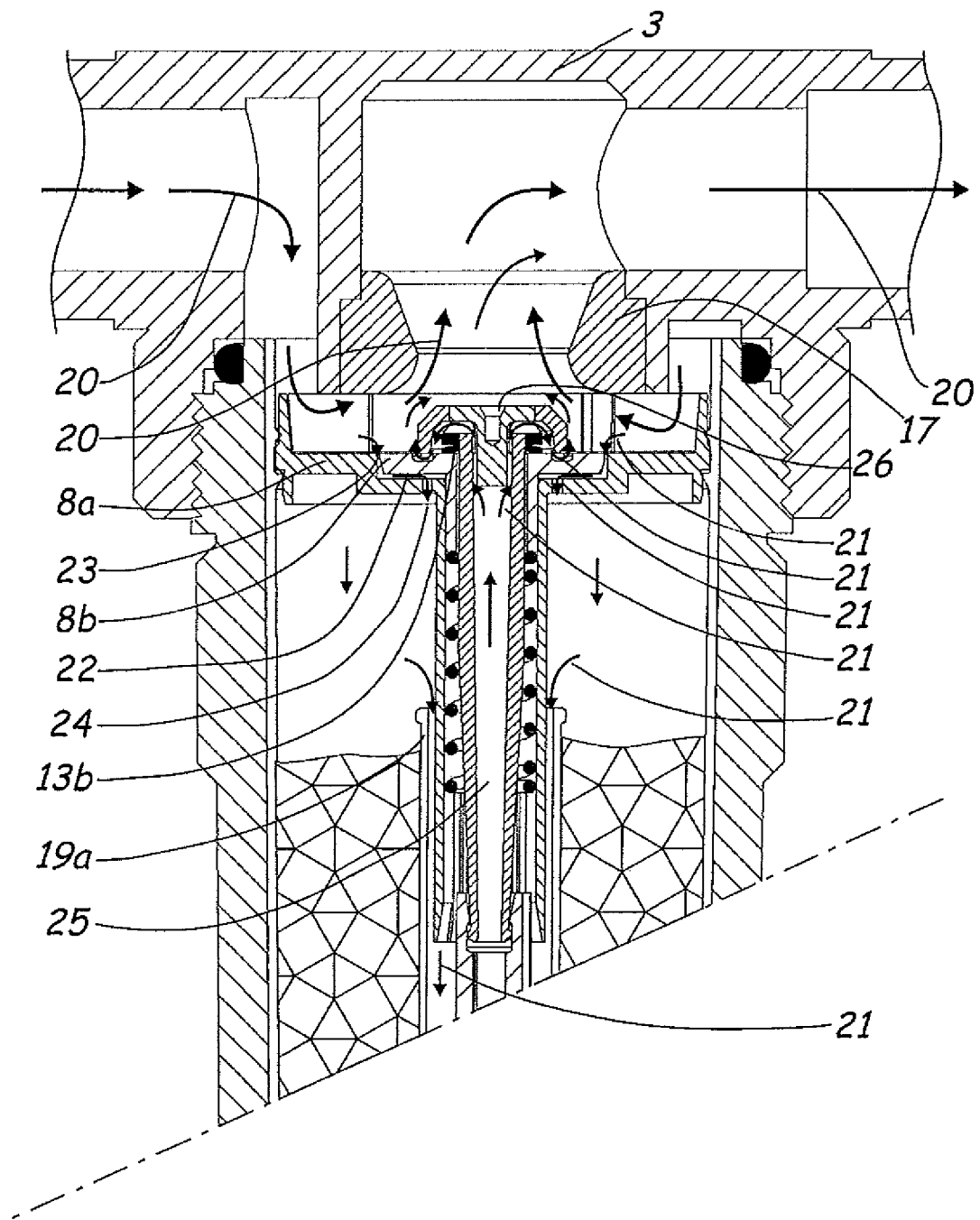
FIG. 3a shows on a somewhat larger scale the top part of FIG. 1 with flow.
Figure 3B:
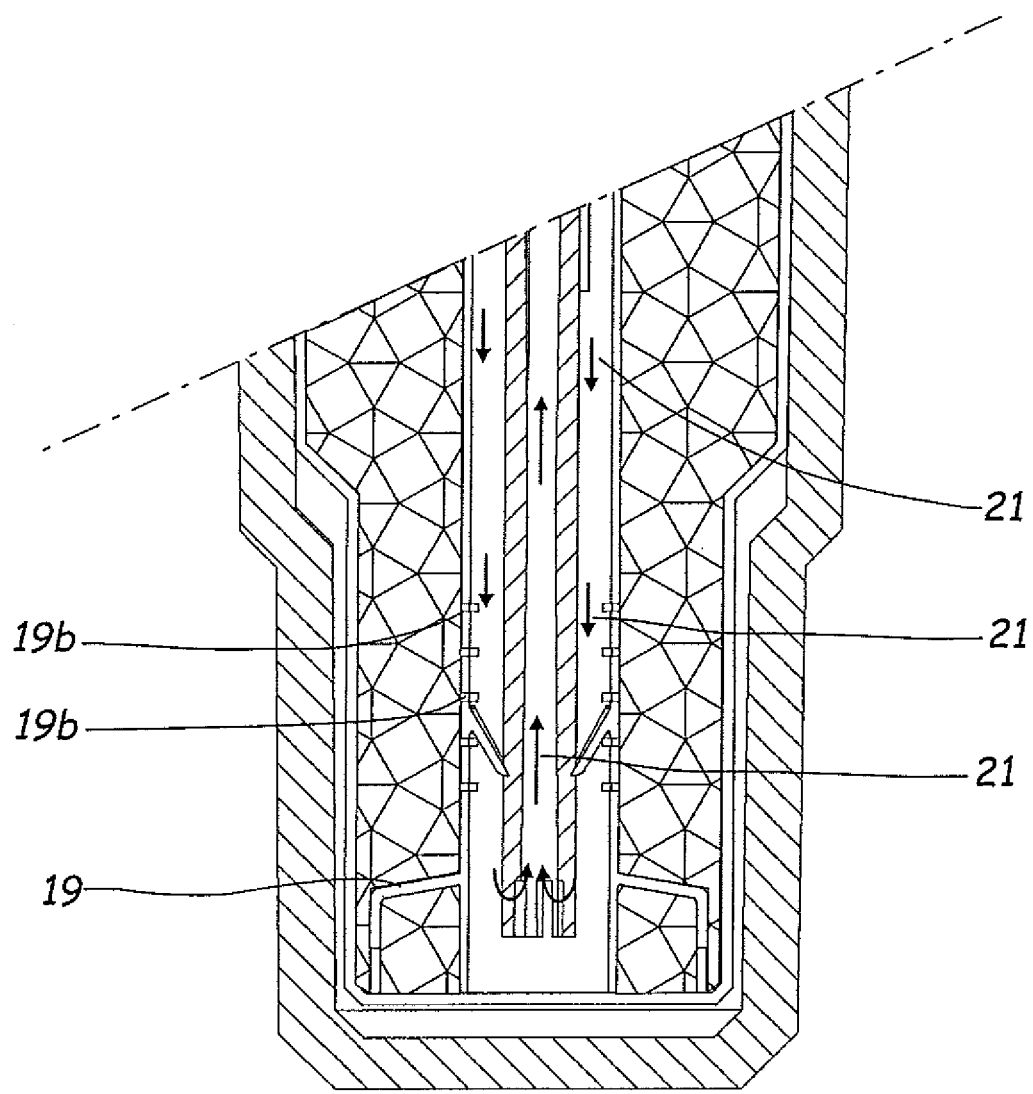
FIG. 3b shows on a somewhat larger scale the bottom part of FIG. 1 with flow.

FIGS. 3a and 3b show the top and bottom section respectively of FIG. 1 on a somewhat larger scale, in order to show the components and the main flow and side flow in more detail.

The cartridge 7 is affixed in the housing 6 such that the first wall 8a of the cartridge is situated at the level of the opening in the housing 6, and additive 2 is kept separate from the main flow 20 by the first wall 8a, sidewall 10 and its base the second wall 9.

It is characteristic of the invention that the device 1 with its cartridge 7 is equipped with audio means 11, which, according to the embodiment shown in FIGS. 1 and 2, take on the form of a ram 13 and a head 13a, whereby this ram 13 is movably connected to a tubular body 12 and forms a whole with the anchoring means 19.

The top part of the tubular body 12 that extends in the volume of the cartridge 7 is provided with a stop 15, constructed in the form of ribs 16 that can move vertically between ribs affixed in the inside diameter of a tubular extension of the first wall 8a. An elastic element 14, in this case a compression spring, is affixed between the bottom part of the small access plate 8b and the ribs.

Figure 3C:
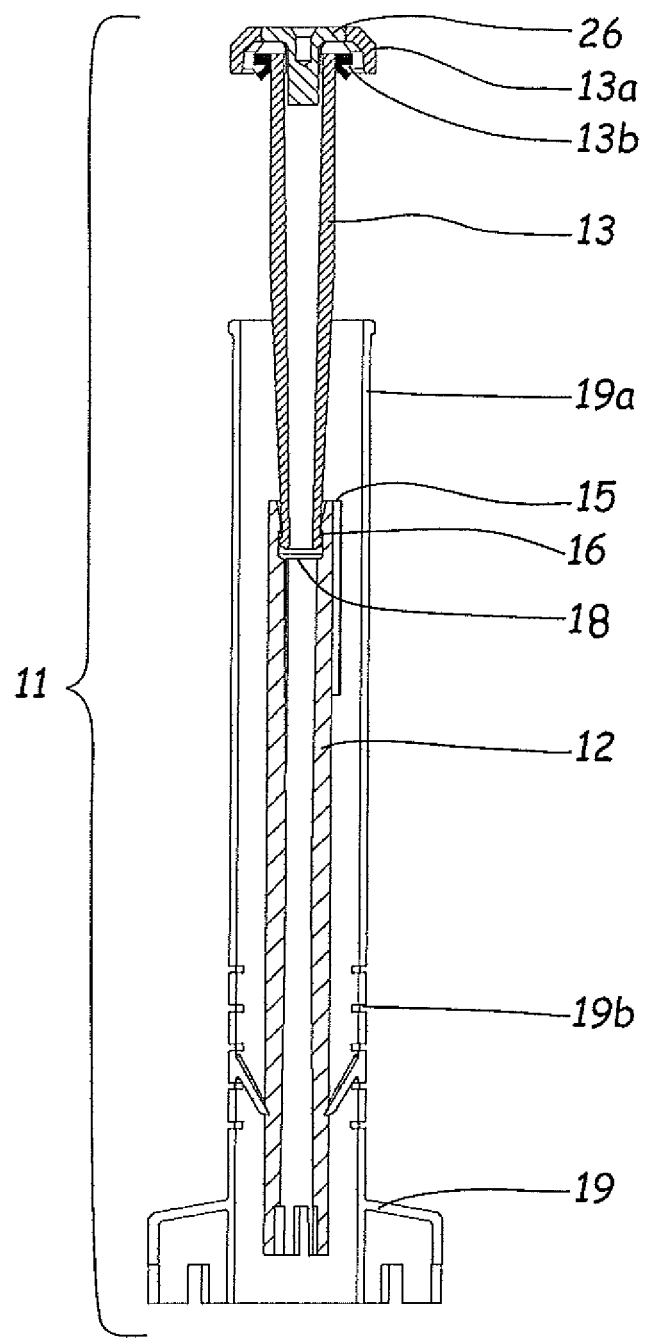
FIG. 3c shows on a somewhat larger scale the audio means 11 of the cartridge according to the invention.

FIG. 3c shows the audio means 11 separately. The audio means 11 consist of a ram 13 with a head 13a, a tubular body 12 with which the ram 13 is movably connected by a movable connection 18, and whereby the tubular body 12 is in turn connected to the anchoring means 19.

It is clear that the audio means 11 can take on another embodiment without acting outside the scope of the invention.

The method for filling the additive 2 is such that the cartridge at the bottom is filled with a small quantity of water at the level of the anchoring means 19, so that with the additive 2 a thick—supersaturated—mixture of the additive 2 occurs that hardens further due to hydration of the other part of the additive 2 that is very hygroscopic, thereby closes about the anchoring means 19 more strongly and thereby connects the side wall 10 to its base, the second wall 9.

The operation of a dispensing device 1 according to the invention is very simple and as follows.

The liquid, in this case water, is guided past the inlet 4 of the headpiece 3 in the device 1, whereby a certain quantity of additive 2 is added to the water flow, after which the water leaves the device 1 through the outlet 5.

Because the anchoring means 19, the tubular body 12 and the ram 13 form a single component in the assembled state, in the case as shown in FIG. 1, the ram 13 is blocked by the additive 2 itself.

As a certain quantity of water flows through the device 1, the additive 2 is carried along and decreases in quantity until the additive 2, including the supersaturated mixture, is completely consumed.

Figure 4:
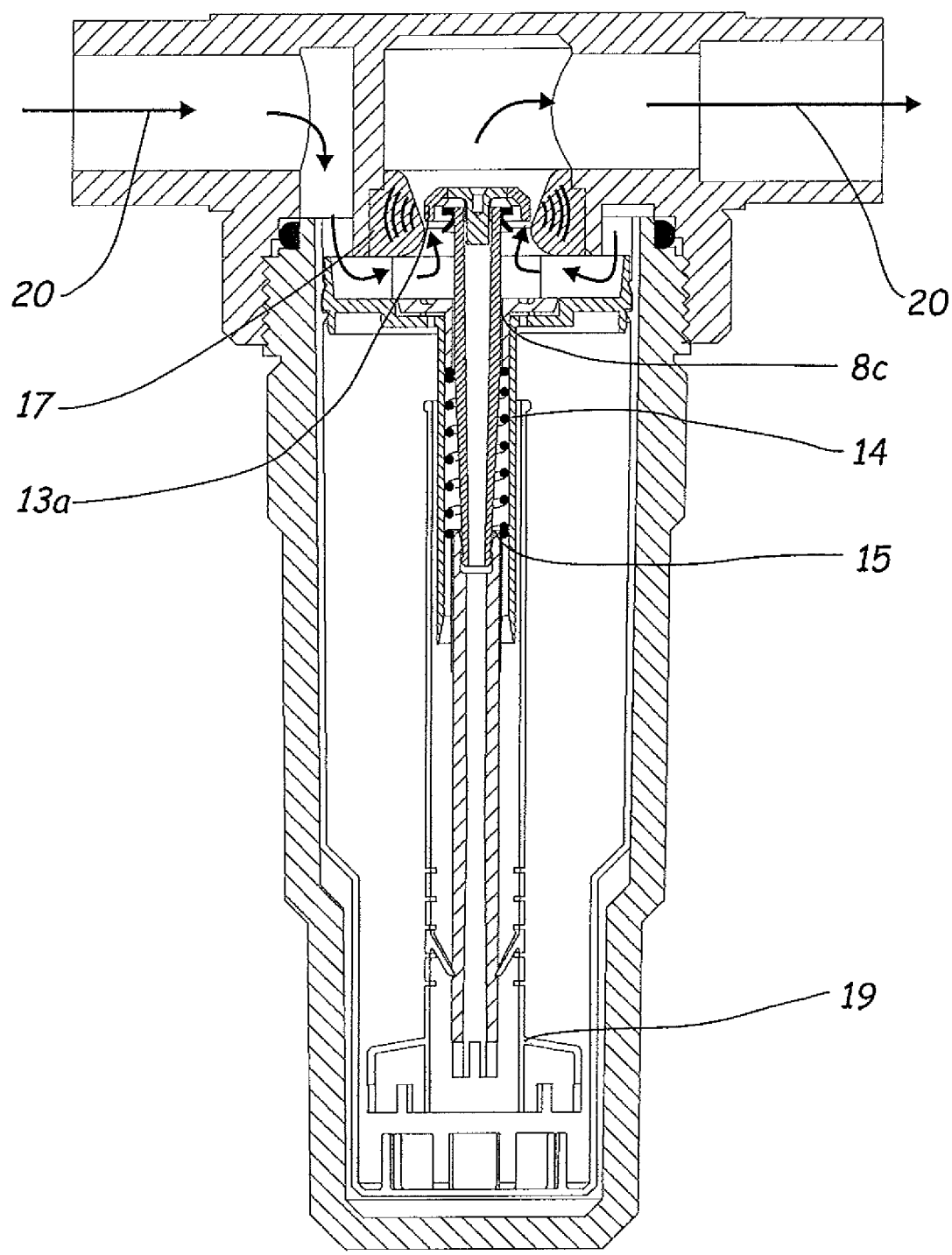
FIG. 4 shows a cross-section similar to that of FIG. 1, but with a spent cartridge with low flow.

The aforementioned situation is shown in FIG. 4, whereby the cartridge 7 no longer contains any additive 2. As the additive 2 is completely consumed, it can no longer exert any resistance on the anchoring means 19, the tubular body 12 and the ram 13, such that the whole, and thus also the ram 13, comes loose. In other words, in this case the ram 13 is in the unblocked position.

As a result the entire audio means 11, and thus also the ram 13, with its head 13a, the tubular element 12 and the anchoring means 19 will move upwards.

This upward movement is primarily caused because the combined specific gravity of the components (12, 13, 13a and 19) of the audio means 11 is lower than water. This upward movement is helped by the springloaded washer and also by the water flow around the head (13a).

This upward movement will have a first limitation because the pre-stressed compression spring 14 reaches the stop 15. More specifically, the ram 13 will move upwards through the transit opening 8c in the small access plate 8b and the first wall 8a of the cartridge, and the head 13a will come in position at the level of the nozzle-shaped passage 17.

In this position the ram 13, that is movably connected to the tubular body 12, is in an unstable state and in the event of water flow the head 13a of the ram 11 comes up against the wall of the passage 17 such that a sound is produced in a purely mechanical way.

As a result, in the event of water flow, a sound occurs that can be noticed by the user of the device 1 and which informs the user of the fact that the additive 2 is used up.

Depending on the strength of the compression spring 14, in the event of a greater water flow the ram 13 and the head 13a will move further upwards up to the divergence of passage 17.

This last-mentioned upward movement occurs under the influence of the force of the flowing water exerted on the head 13a.

The ram 13 is in the transit opening 8c and experiences a radial movement restriction in the inside diameter of the small access plate 8b. As a result, the head 13a of the ram 11 will come up against the wall of the passage 17 less or not at all, so that the sound developed decreases or completely stops.

Thus with a very strong compression spring 14 the sound will be maintained in the event of a large water flow. If the compression spring 14 is replaced by a fixed, incompressible element—for example by a small sleeve or extension of the bottom tubular part of the small access plate 8b—the sound of the dispensing device will not stop even with very large flows of the water.

As a result different embodiments can be obtained that are adapted to the area of application.

For example an embodiment can be realised that generates a sound signal in the event of a small water offtake—for example whenever a tap is opened, but whereby this sound will cease in the event of a greater water offtake—which in some cases favours comfort.

On the other hand a variant embodiment can be obtained whereby the sound also continues in the event of a greater water offtake.

Figure 5:
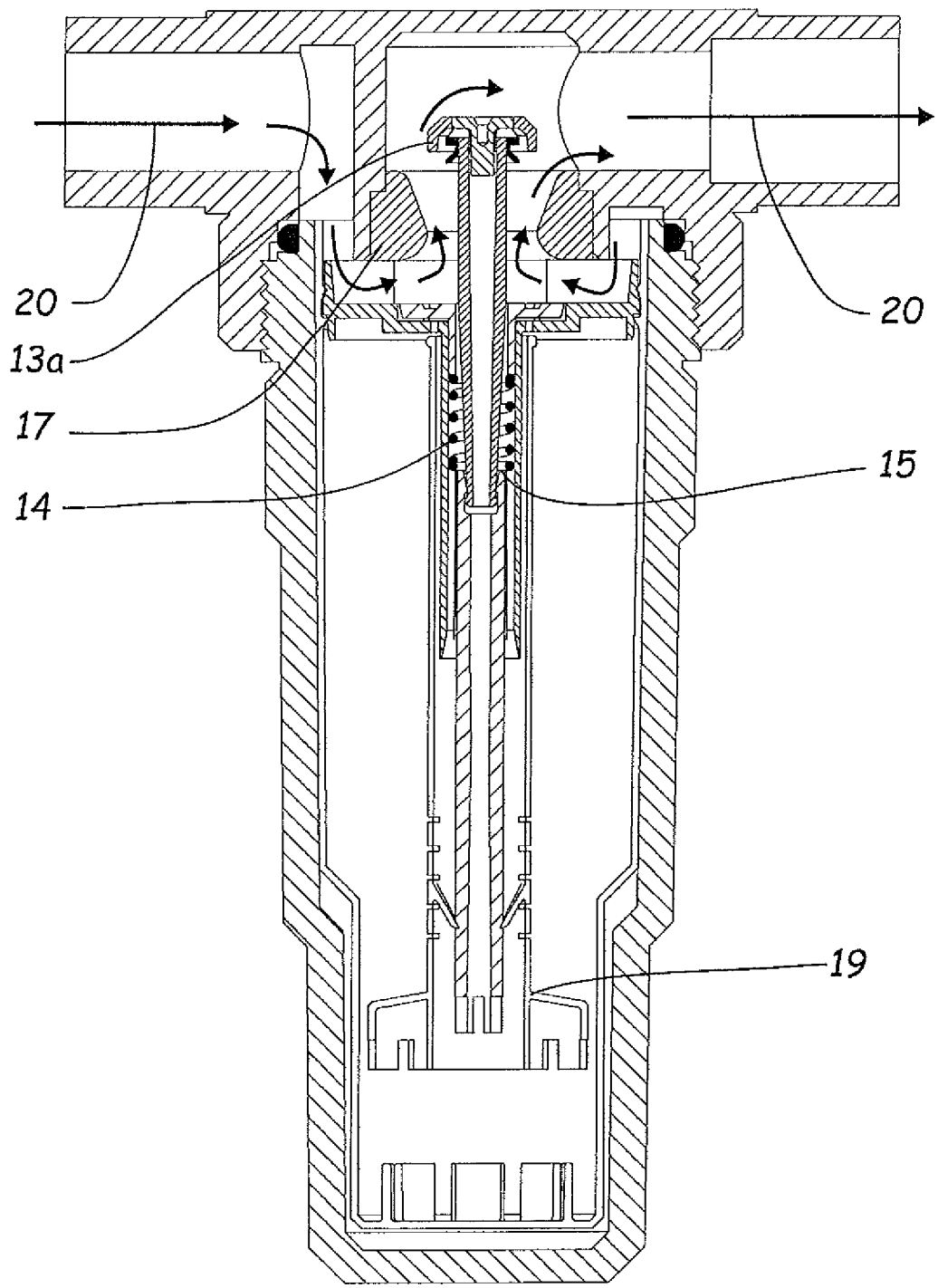
FIG. 5 shows a cross-section similar to that of FIG. 4, but for another state of the anchoring means on account of a larger flow.

FIG. 5 shows a position whereby the head 13a no longer touches the wall of the passage 17.

In the embodiment shown in FIGS. 3 and 4 the water flow that flows through the headpiece 3 forms the majority of the flow rate and is consequently called the main flow 20. A proportion is tapped off from this to form a side flow 21.

The side flow 21 is guided through the volume of the cartridge 7, after which the aforementioned side flow again joins the main flow 20 as shown in FIG. 3a, but is missing in FIG. 5 because there is no side flow 21 here.

By guiding a side flow 21 through the volume of the cartridge 7, a proportion of the additive 2 will be dissolved and carried along in limited quantities with the side flow 21 up to the main flow 20.

Preferably the first wall 8a of the cartridge is provided with a small access plate 8b that forms a double wall with the first wall 8a such that a transit space 22 is created for the side flow 21 through which the side flow flows into the volume of the cartridge 7.

The side flow 21 flows into the transit space 22 through a cutaway 23, provided between the first wall 8a and the sunken small access plate 8b. The wall 8a is provided with holes 24 at the bottom through which the side flow 21 can leave the transit space 22 and flow in the cartridge 7.

Furthermore the side flow 21 in the tubular part 19a of the anchoring means 19 can flow downwards and dissolve a part of the additive 2 via the passages 19b in the tubular wall of the anchoring means 19, in order to be pushed out adjacently in the tubular body 12 through the bore 25 of the ram 13 via the calibration 26 and then runs into the main flow through the outlet of the side flow 21 that is located on the underside of the head 13a of the ram 13.

The inlet of the side flow 21 is located at a greater diameter than the outlet of the side flow 21. Because the flow speed is different a pressure difference first occurs such that the side flow 21 is obtained, and secondly the rotating movement of the water flow imposed by the fins 27 on the first wall (8a) also causes a pressure difference.

Between the outlet of the side flow 21 and the transit opening 8c in the small access plate 8b there is a seal in the form of a spring washer 13b, which in the blocked state of the audio means 11 closes the transit opening 8c, such that the side flow 21 completely follows the described route. In the unblocked position this spring washer 13b will move upwards together with the ram 13 on which it is mounted; as a result the transit opening 8c is clear and the side flow can be short-circuited through this.

Figure 6:
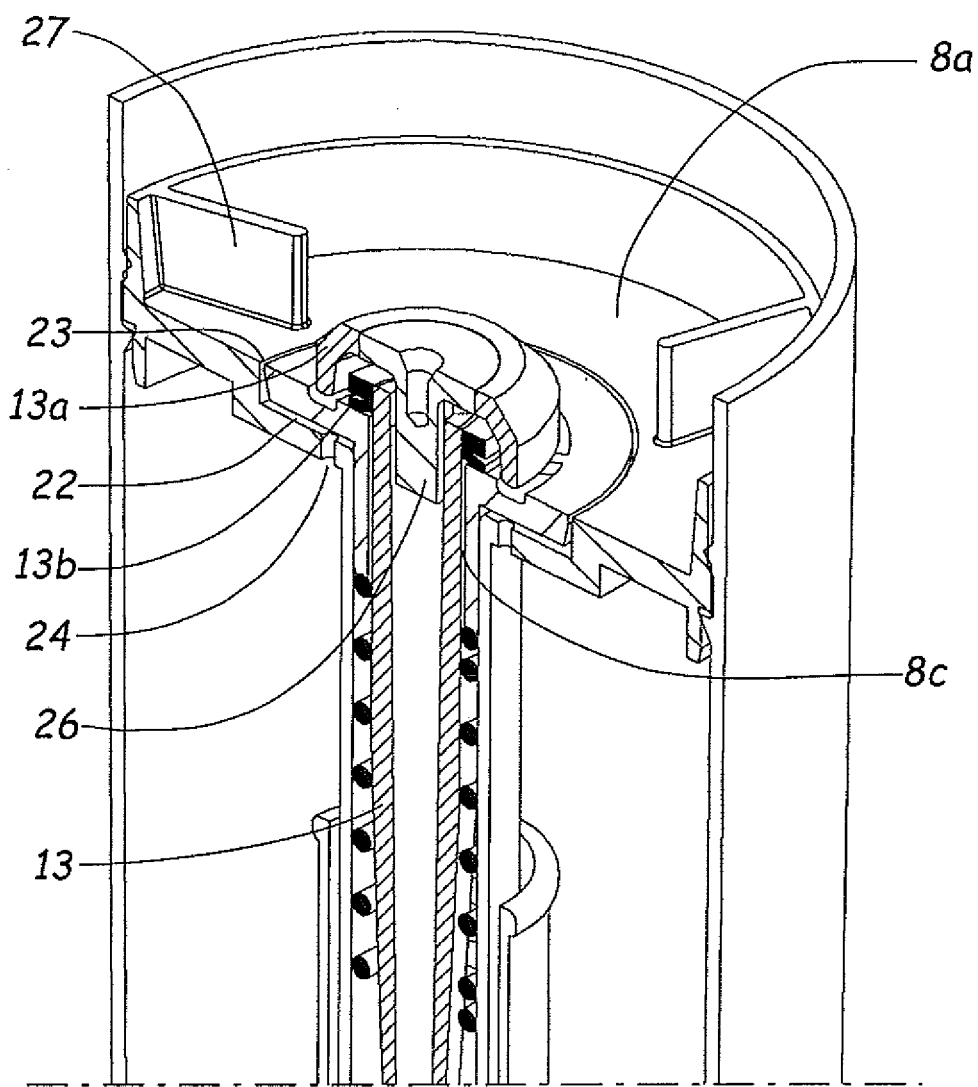
FIG. 6 shows a perspective view of a partial cross-section of the top section of the cartridge according to the invention.

FIG. 6 shows in more detail the cutaway 23, the transit space 22 and the holes 24 through which the side flow 21 can leave the transit space 22, the calibration 26, the transit opening 8c, the passage between the calibration 26 and the wall of the ram 13, as well as the spring washer 13b under the head 13a and the fins 27 that are placed partially radially on the wall 8a.

Figure 7:
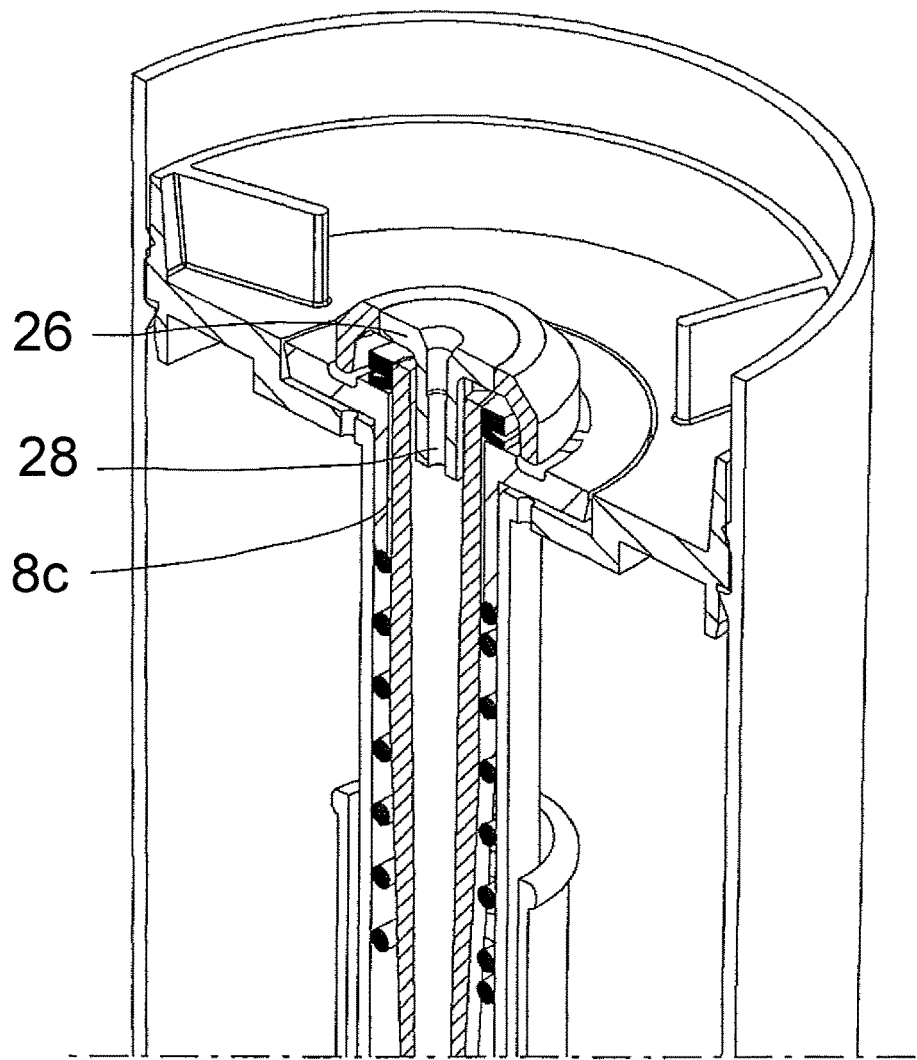
FIG. 7 shows a variant of FIG. 6.

FIG. 7 shows in more detail a variant of FIG. 6, whereby the calibration 26 presents a central opening 28 through which a part of the side flow 21 can run into the main flow.

The central opening 28 also enables the dosing level to be adjusted by varying its diameter according to the desired supply of the additive.

According to another preferred characteristic, the device 1 can be provided with means that impose a rotation movement on the main flow when entering the device 1.

In this way the pressure difference—the driving force to obtain the side flow—between the inlet of the side flow 21 and outlet of the side flow is increased.

Figure 8:
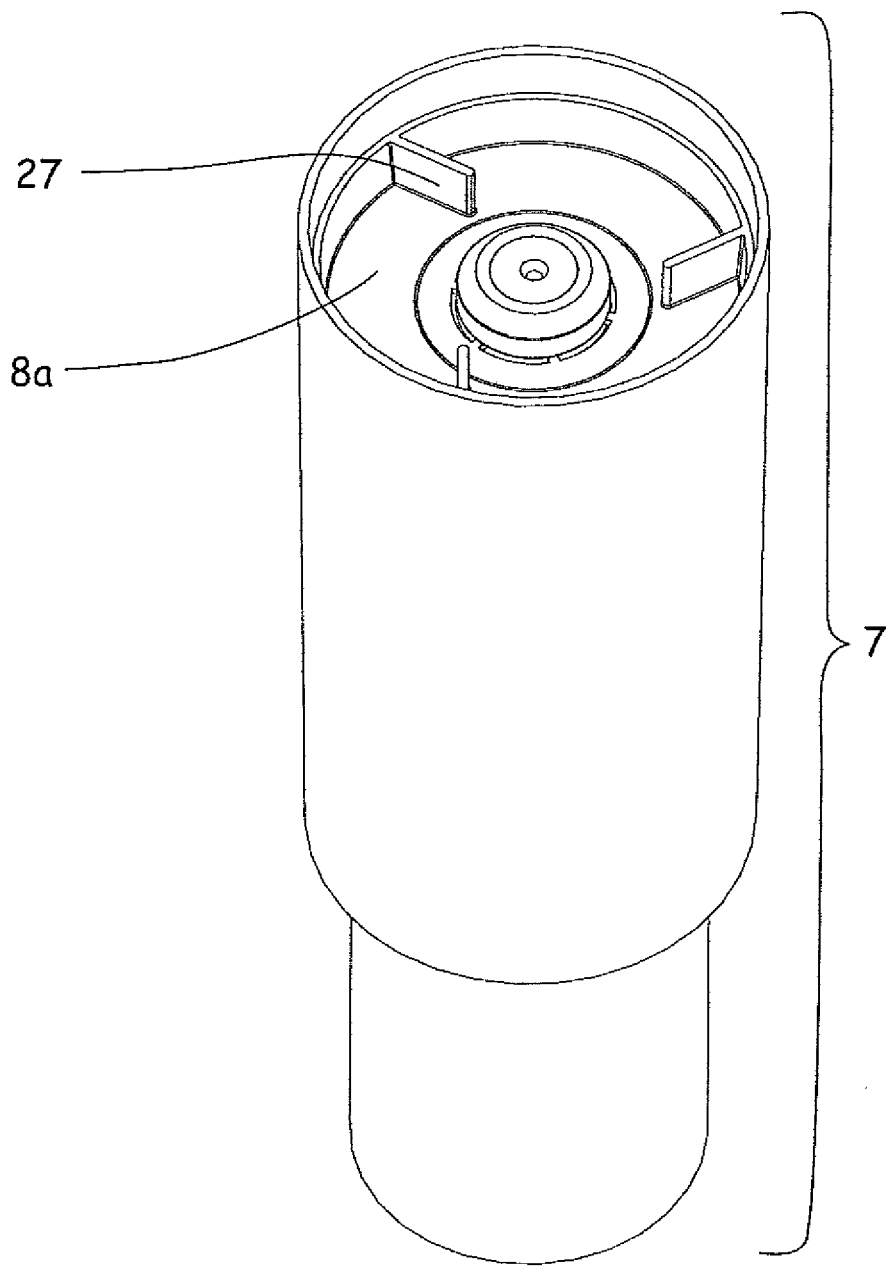
FIG. 8 shows the cartridge as used as a refill cartridge.

FIG. 8 shows a cartridge 7, inserted in the device as a refill cartridge after the previous cartridge has been used up. In this drawing the fins 27 can be seen, which ensure a rotating movement of the main flow that ensures a pressure difference between the inlet and outlet of the side flow by which this side flow is driven.

Figure 9:
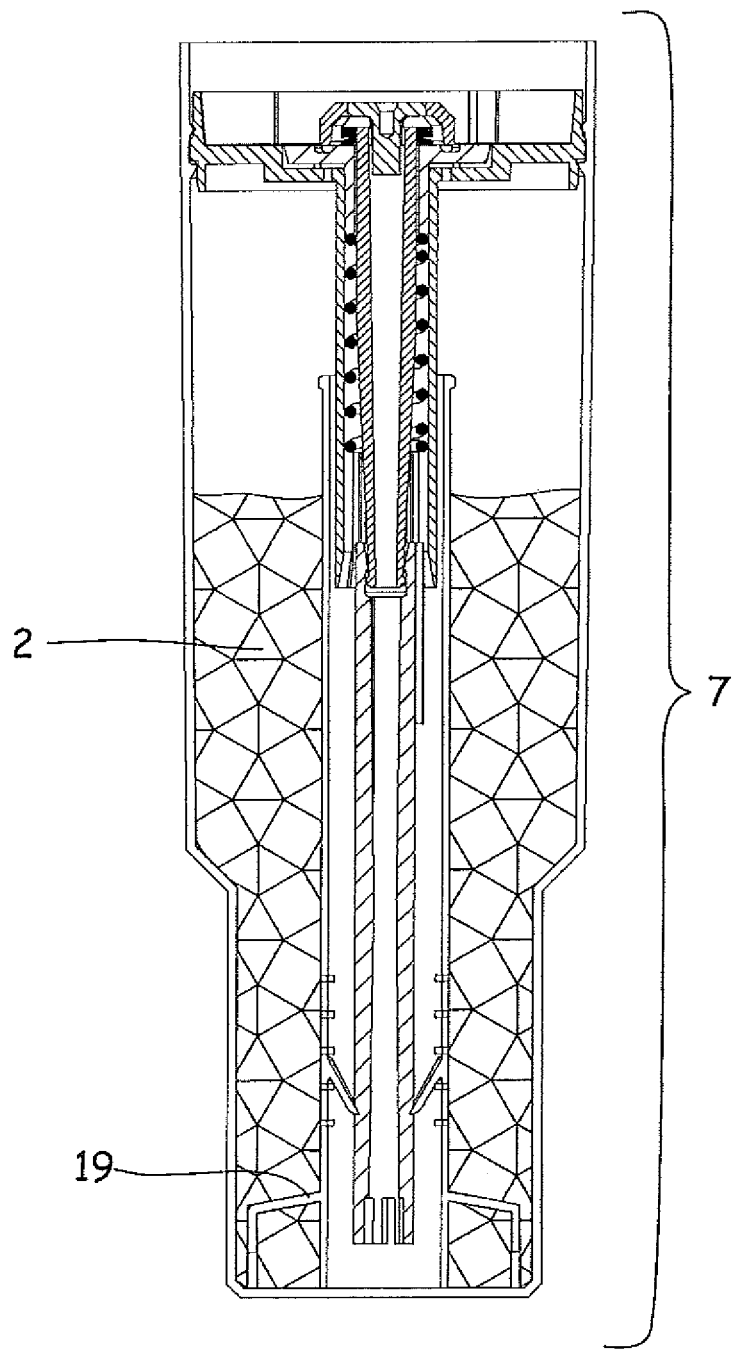
FIG. 9 shows a cross-section of FIG. 8.

FIG. 9 shows a cross-section of the same cartridge 7 of FIG. 8, with the anchoring means 19 in the blocked state because the cartridge is filled with additive and whereby the cartridge is ready for use as a refill cartridge.

Figure 10:
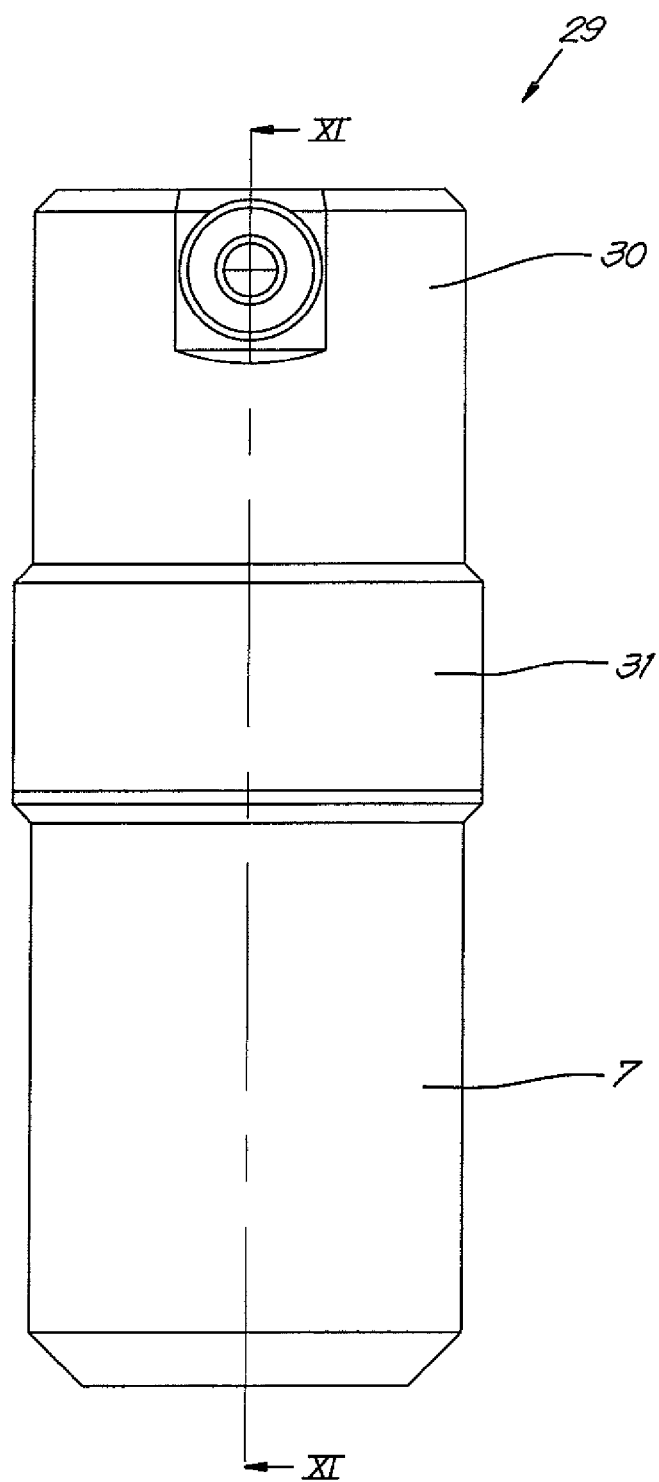
FIG. 10 shows a side view of a variant of the dispensing device.

FIG. 10 shows a side view of a variant 29 of the dispensing device now equipped with a volume metering device 30 positioned in the main flow, that drives a volumetric displacement mechanism 31 in the side flow that controls the throughput of the side flow whereby the side flow is not or not only obtained by the pressure differential between in- and outlet of the side flow, but is primarily determined by the volumetric displacement mechanism 31.

Figure 11:
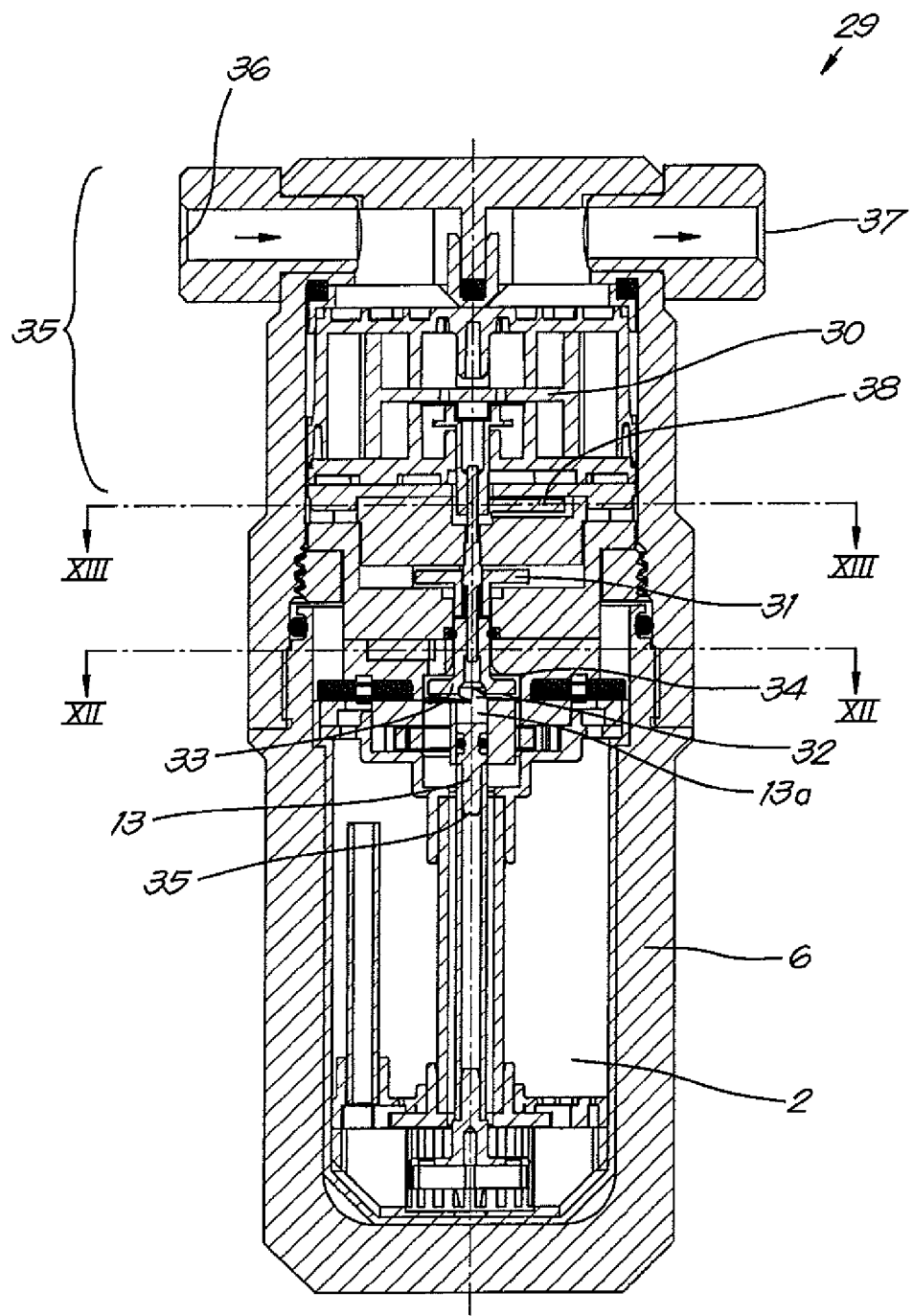
FIG. 11 shows a cross-section of FIG. 10 according to line XI-XI.

FIG. 11 shows the cross-section of the variant of the dispensing device, showing the inside of the enlarged headpiece 35 with an inlet 36 and an outlet 37 for the connection of the device 29 to the water pipe and the same housing 6 for housing the same cartridge that is provided with an opening that connects to the headpiece 35 as in the first dispensing device.

In this case, a different embodiment of the audio means is used that comprise a ram 13 with a head 13a, whereby the head is equipped with means to engage 32 spinning concentric blades 33. When the additive 2 is depleted, the ram 13 is unblocked, and rises upwards engaging the spinning concentric blades 33 that sweep over a fixed toothed ring 34 thereby generating a ratchet sound in a mechanical way.

The ram 13 equipped with the means to engage 32 the spinning concentric blades 33, spins by the driving force of the side flow, which interacts with a blade ring 35 at the bottom of the ram, that spins freely when the additive is consumed. The sound generated by the audio means in a mechanical way, reaches a continuous or discontinuous sound level of between 80 and 85 dB.

The enlarged headpiece 35 houses a water metering device 30 driven by the main flow of water running through the device 29, that drives through a mechanical transmission 38, another volumetric displacement mechanism 31 in the side flow. The water metering device 30 measures the throughput of the main flow, and insures a constant dosage of additive 2 added to the main flow by controlling the flow rate of the side flow in a mechanical way.

The ram 13 that is unblocked when the additive is consumed is rising upwards as a result of buoyancy due to the density of the ram 13 being lower than the density of water or by the action of a mechanical spring (not shown).

Figure 12:
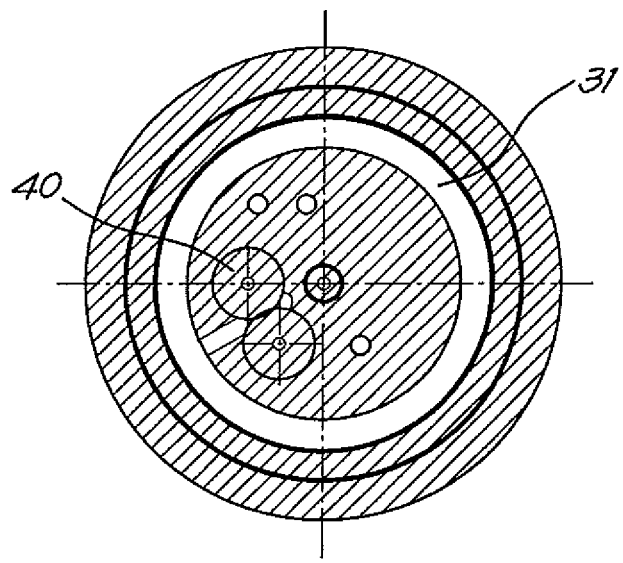
FIG. 12 shows a cross section of FIG. 11 according to line XII-XII.

FIG. 12 shows another cross-section of the variant 29 of the dispensing device perpendicular to the longitudinal axis of the device, now going through the volumetric displacement mechanism 31, in this case a gearwheel pump, that drives the side flow and determines the flow ratio in the side flow versus the main flow, and showing gearwheels 40 that are driven by the metering device 30, generating a lower but proportional flow of the side flow.

Figure 13:
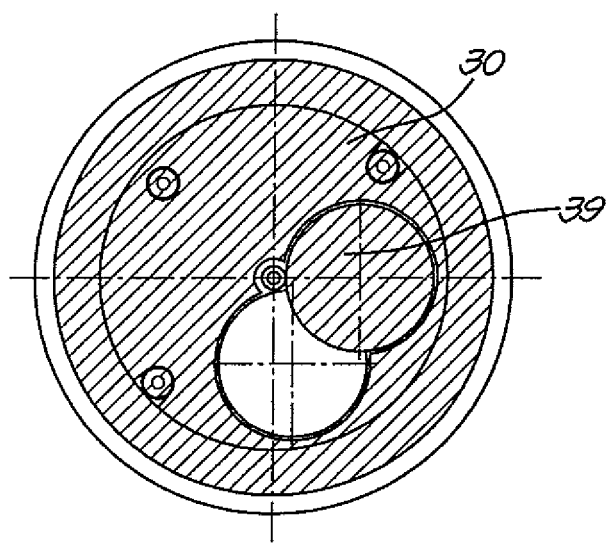
FIG. 13 shows a cross section of FIG. 11 according to line XIII-XIII.

FIG. 13 shows a cross-section of the variant 29 of the dispensing device perpendicular to the longitudinal axis of the device, and going through the volume metering device 30. Some gearwheels 39 are shown that belong to the volume metering device 30, that is driven by the main fluid flow.

Figure 14:
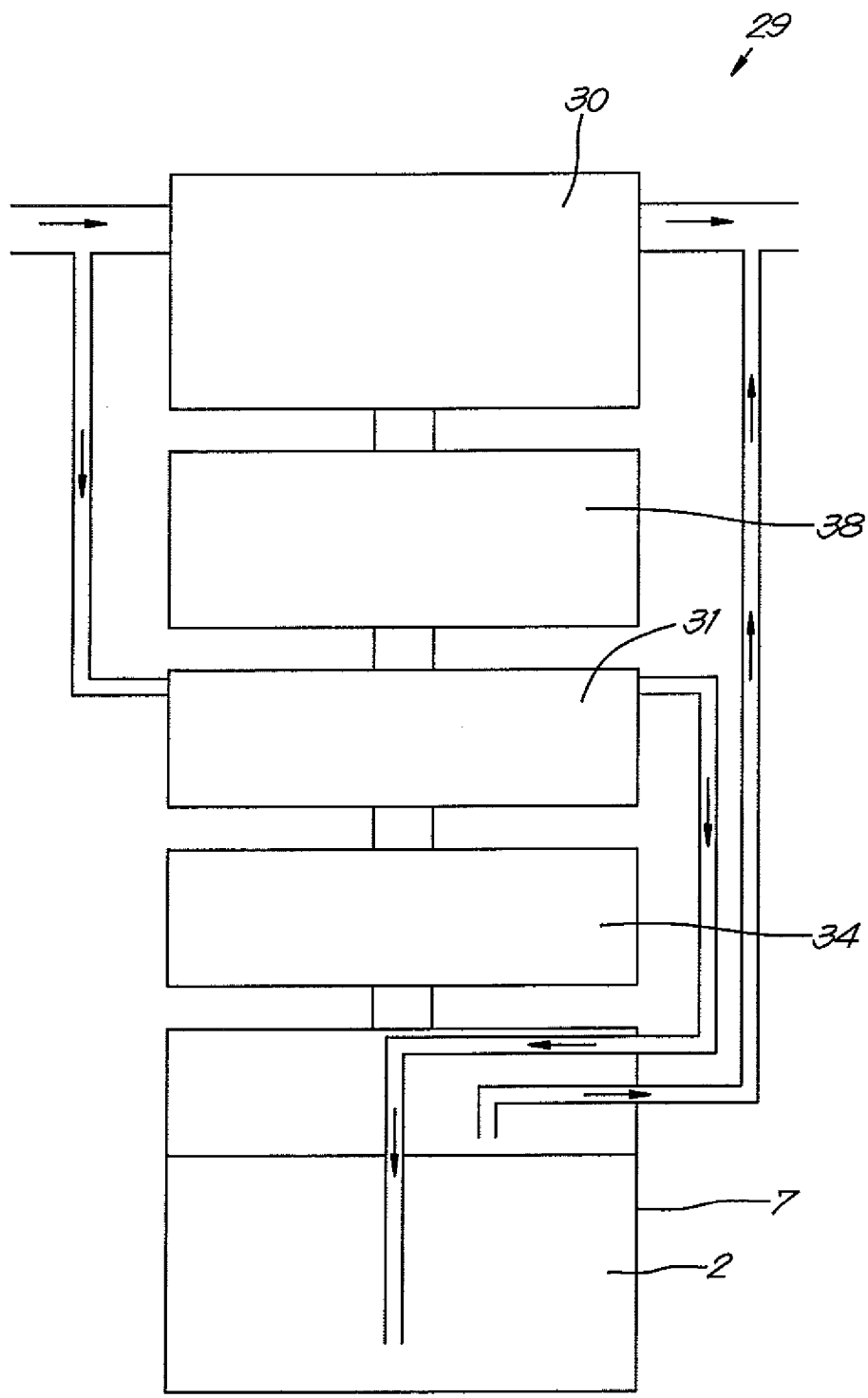
FIG. 14 shows a schematic flow diagram of the variant dispensing device.

FIG. 14 shows a schematic flow chart of the variant 29 of the dispensing device containing from top to bottom: a water metering device 30 driven by the main water flow to which the dispensing device is attached; a transmission that transfers the movement of the water metering device 30 to a volumetric displacement mechanism 31 being a pump to control the side flow; mechanical sound generating means in this case a ratchet 34 also driven by the water metering device 30 in the main flow; an engaging mechanism at the top of the ram to engage the ram from the cartridge when unblocked due to depletion of additive; an anchoring device 41 at the bottom of the ram to block the ram in the cartridge when the additive is not depleted; the exchangeable cartridge 7 with additive to supply the additive 2 to the main flow.

Figure 15:
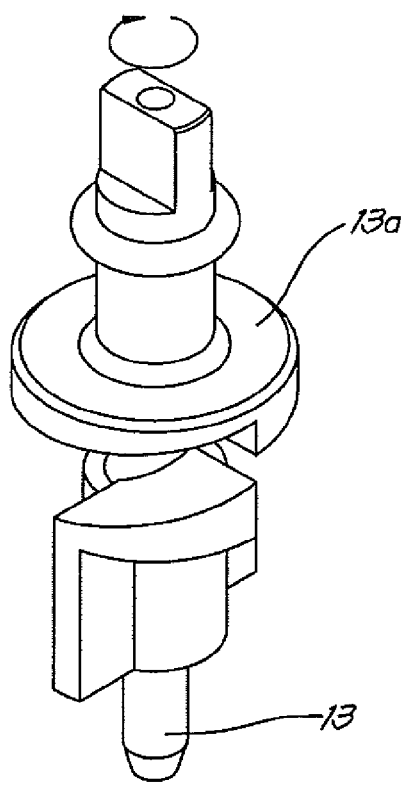
FIG. 15 shows a ram with a rattling head in a non engaged position.

FIG. 15 shows the head of the ram 13*a* in a non engaged position, that means during the time that the additive in the cartridge 7 is not depleted yet.

Figure 16:
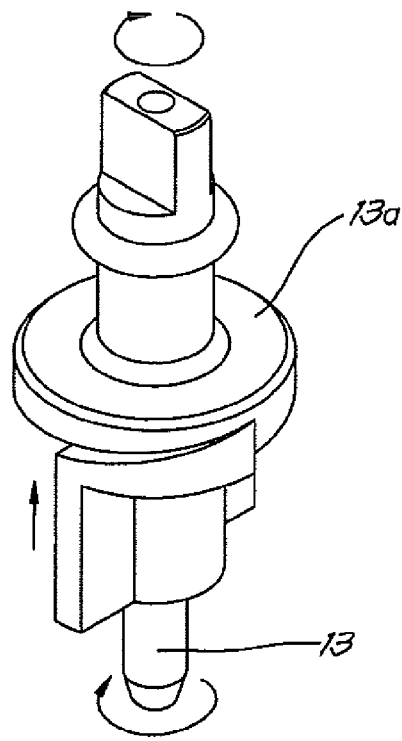
FIG. 16 shows the ram with rattling head in an engaged position.

FIG. 16 shows the same head of the ram but now in an engaged position, due to the rise of the ram as a consequence of the depletion of the additive and the subsequent freeing of the anchoring part 41 at the bottom of the ram 13.

Figure 17:
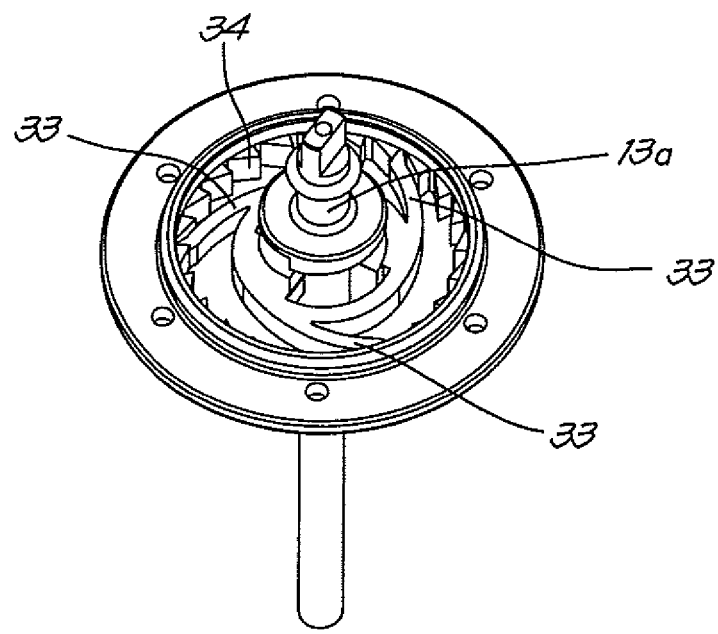
FIG. 17 shows the ratchet while it is struck by the rattling head in an engaged position.

FIG. 17 shows the ratchet comprising a fixed toothed ring 34 that is struck by concentric blades 33 that are spinning around a central axis and are driven by the ram head 13*a* which is engaged with the ring with concentric blades 33 at a time when the additive in the cartridge is depleted.

Figure 18:
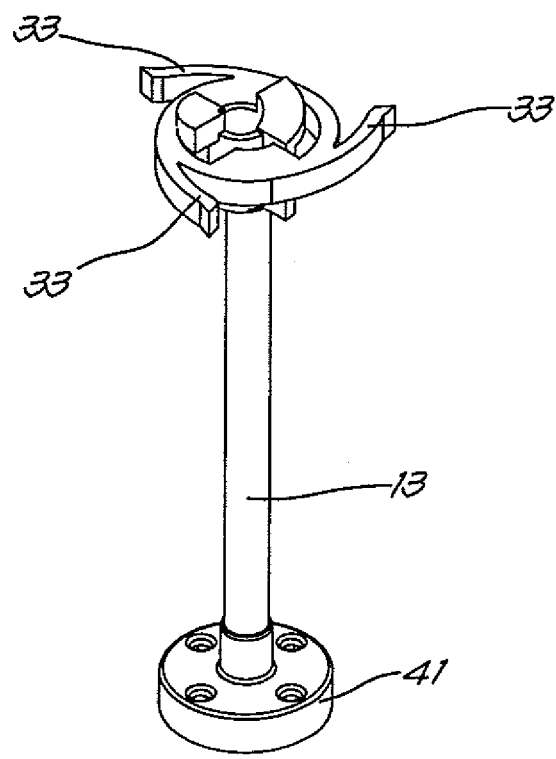
FIG. 18 shows the ram with head and foot.

FIG. 18 shows the ram 13 with at its bottom the anchoring part 41, which holds the ram stuck at the bottom of the cartridge 7, until the additive is depleted and the anchoring part 41 is freed so as to enable the ram to rise to a higher level and to activate the concentric blades 33 sweeping the ratchet 34.

The present invention is by no means limited to the embodiments described as an example and shown in the drawings, but a dispensing device 1 according to the invention can be realised in all kinds of variants, without departing from the scope of the invention as described in the claims.

The invention claimed is:

1. A dispensing device for dispensing a dose of an additive to a liquid that is flowing in a pipe, the dispensing device comprising:
    a headpiece with an inlet and an outlet for connecting the dispensing device to the pipe,
    a housing connected to the headpiece and having an interior volume in which the additive can be contained, and
    an audio generator that does not generate sound when the amount of the additive contained in the interior volume of the housing exceeds a prescribed amount, and that uses liquid flow through the dispensing device to generate sound to provide an indication that the amount of additive has dropped below the prescribed amount.

2. The dispensing device according to claim 1, further comprising a cartridge disposed within the housing,
    wherein the cartridge includes a first wall, a second wall that is located opposite the first wall, and a side wall that extends between the first and second wall, wherein the first wall, the second wall, and the third wall define the interior volume,
    wherein the first wall is provided with holes through which a side flow can leave a transit space and flow into the cartridge,
    wherein the cartridge includes a small access plate,
    wherein the first wall is at the level of an opening in the housing, and
    wherein the audio generator does not generate sound when the amount of the additive contained in the interior volume of the housing exceeds a prescribed amount and uses liquid flow through the dispensing device to generate sound to provide an indication that the amount of additive has dropped below the prescribed amount.

3. The dispensing device according to claim 2, wherein the audio generator includes:
    a ram with a head,
    a tubular body, and
    an anchor,
    wherein the head of the ram is located outside the interior volume of the cartridge.

4. The dispensing device according to claim 2, wherein the side flow is not or not only obtained by the pressure differential between an inlet and outlet of the side flow, and
    wherein the side flow is primarily determined by a volumetric displacement mechanism in the side flow that is driven by a volume metering device positioned in the liquid flow.

5. The dispensing device according to claim 4, wherein the headpiece is an enlarged headpiece, and
    wherein the volume metering device is housed in the enlarged headpiece and drives through a mechanical transmission in the side flow, which is another volumetric displacement mechanism.

6. The dispensing device according to claim 4, wherein the audio generator includes:
    a ram with a head, wherein the head includes an engagement portion that is engageable with spinning concentric blades when the additive is depleted, wherein when the ram is in an unblocked position the ram rises upwards engaging the spinning concentric blades that sweep over a fixed toothed ring, thereby generating a ratchet sound in a mechanical way.

7. The dispensing device according to claim 6, wherein the ram spins by a driving force of the side flow, which interacts with a blade ring at the bottom of the ram, that spins freely when the additive is depleted.

8. The dispensing device according to claim 1, wherein the audio generator includes:
    a ram with a head,
    a tubular body, and
    an anchor,
    wherein the head of the ram is located outside the interior volume of the housing that is defined by a first wall.

9. The dispensing device according to claim 8, wherein the ram is movably connected to the tubular body.

10. The dispensing device according to claim 9, wherein the headpiece includes a nozzle-shaped passage for the liquid flow and the head of the ram is disposed within the nozzle-shaped passage when the audio generator generates sound.

11. The dispensing device according to claim 10, wherein the tubular body that connects the ram and the anchor includes a stop that a spring reaches when the audio generator generates sound.

12. The dispensing device according to claim 11, wherein the spring is engageable with the stop of the tubular body, that is connected to the ram, so that the head can move beyond the nozzle-shaped passage to prevent the audio generator from generating any more sound.

13. The dispensing device according to claim 8, wherein the additive grips or encloses the anchor to prevent the audio generator from generating sound,
    wherein the anchor is connected to the ram via the tubular body, and
    wherein the anchor is located in a section of the dispensing device where the additive that is used last is located.

14. The dispensing device according to claim 8, wherein the anchor is gripped by forming a thick mass that arises through the addition of water to the additive that connects the anchor to a side wall and a second wall of the housing.

15. The dispensing device according to claim 8, wherein an elastic element is provided between supporting ribs at the level of the inside diameter of a first wall and a cylindrical part of a small access plate.

16. The dispensing device according to claim 8, wherein a calibration of the head of the ram includes a central passage to fluidly connect the side flow to the liquid flow at a passage between the calibration and a bore defined by the tubular wall, wherein the diameter of the central passage determines dosage levels of the additive.

17. The dispensing device according to claim 8, further comprising fins that are partly radially oriented on a first wall of the housing,
wherein the fins generate a rotating movement of the liquid flow.

18. The dispensing device according to claim 8, further comprising an elastic seal that is between an outlet of a side flow and a transit opening,
wherein the transit opening opens when the ram is in an unblocked position such that no dispensing occurs, and
wherein when the ram is in a normal blocked position the side flow is forced through the additive.

19. The dispensing device according to claim 1, wherein a part of the liquid flow that flows through the headpiece of the dispensing device is tapped off to form a side flow that is guided through the interior volume of the housing, after which the side flow again joins the liquid flow; whereby an inlet of the side flow is formed between a first wall and a small access plate by a cutaway that is located radially outward of an outflow of the side flow.

20. The dispensing device according to claim 19, wherein a first wall is constructed with a small access plate as a double wall that defines a transit space for the side flow and through which the side flow flows into the interior volume of the housing through holes provided in the first wall of the cartridge.

21. The dispensing device according to claim 20, wherein the dispensing device includes:
a ram with a head, and
a hollow tubular body, which includes a longitudinally extending bore,
wherein the head includes a calibration that opens out to a bottom of the head, and
wherein the side flow flows through the head to leave the interior volume of the housing to again join the liquid flow.

22. The dispensing device according to claim 19, further comprising fins that impose a rotation movement in the liquid flow when entering the dispensing device.

23. The dispensing device according to claim 1, wherein at least part of the housing can be replaced by a refill cartridge.

24. The dispensing device according to claim 1, wherein the sound generated by the audio generator in a mechanical way, reaches a continuous sound level of between 80 and 85 dB.

\* \* \* \* \*

UNITED STATES PATENT AND TRADEMARK OFFICE
CERTIFICATE OF CORRECTION

PATENT NO.         : 9,505,604 B2
APPLICATION NO.    : 14/417609
DATED              : November 29, 2016
INVENTOR(S)        : Guido Ivo Cesar Van de Moortele It is certified that error appears in the above-identified patent and that said Letters Patent is hereby corrected as shown below:

In the Claims

Claim 18 starting at Column 9, Line 16 appears as:

"18. The dispensing device according to claim 8, further comprising an elastic seal that is between an outlet of a side flow and a transit opening,
 wherein the transit opening opens when the ram is in an unblocked position such that no dispensing occurs, and wherein when the ram is in a normal blocked position the side flow is forced through the additive."

Claim 18 starting at Column 9, Line 16 should be changed to:

--18. The dispensing device according to claim 8, further comprising an elastic seal that is between an outlet of a side flow and a transit opening,
 wherein the transit opening opens when the ram is in an unblocked position such that no dispensing occurs, and wherein when the ram is in a blocked position the side flow is forced through the additive.--

Signed and Sealed this
Twenty-fifth Day of April, 2017

Michelle K. Lee
*Director of the United States Patent and Trademark Office*